United States Patent
Nelson et al.

(10) Patent No.: US 8,568,645 B2
(45) Date of Patent: Oct. 29, 2013

(54) METHOD OF MAKING STRUCTURAL MEMBERS USING WASTE AND RECYCLED PLASTICS

(76) Inventors: Darrel S. Nelson, Warren, MI (US); James M. Oliver, Roseville, MI (US)

( * ) Notice: Subject to any disclaimer, the term of this patent is extended or adjusted under 35 U.S.C. 154(b) by 0 days.

(21) Appl. No.: 12/834,050

(22) Filed: Jul. 12, 2010

(65) Prior Publication Data
US 2012/0007284 A1    Jan. 12, 2012

(51) Int. Cl.
*C08J 5/00*    (2006.01)

(52) U.S. Cl.
USPC .................................................. 264/331.15

(58) Field of Classification Search
USPC ......................... 264/331.1, 331.15
See application file for complete search history.

(56) References Cited

U.S. PATENT DOCUMENTS

| | | |
|---|---|---|
| 4,661,533 A | 4/1987 | Stobby |
| 5,043,081 A | 8/1991 | Colin |
| 5,241,795 A | 9/1993 | Giroux |
| 5,369,147 A | 11/1994 | Mushovic |
| 5,508,315 A | 4/1996 | Mushovic |
| 5,604,266 A | 2/1997 | Mushovic |
| 5,730,371 A | 3/1998 | Dongieux |
| 6,258,547 B1 | 7/2001 | Beri |
| 6,322,737 B1 | 11/2001 | Beyer |
| 6,488,766 B2 | 12/2002 | Balkum |
| 6,662,506 B2 | 12/2003 | Fischer |
| 6,673,247 B2 | 1/2004 | Olson |
| 6,694,690 B2 | 2/2004 | Li |
| 6,758,996 B2 | 7/2004 | Monovoukas |
| 6,809,131 B2 | 10/2004 | Li |
| 6,969,423 B2 | 11/2005 | Li |
| 6,984,670 B2 | 1/2006 | Meyers, III |
| 7,083,728 B2 | 8/2006 | Logan |
| 7,169,224 B2 | 1/2007 | Li |
| 7,241,338 B2 | 7/2007 | Li et al. |
| 7,297,720 B2 | 11/2007 | Meyers, III |
| 7,572,501 B2 | 8/2009 | Li |

OTHER PUBLICATIONS

Kim et al., The Application of Recycled Plastics filled with Sludge Ash as Construction Material, Environ. Engg. Res., vol. 2, No. 4, 1997.*
Lin et al., Use of Sewage Sludge Ash as Brick Material, J. of Env. Engg. vol. 127, No. 10, Oct. 2001.*
"Ash Handling and Recycling," Wastewater Solids Incineration Systems, Chapter 8, pp. 175-195, Apr. 2009.*

* cited by examiner

*Primary Examiner* — Larry Thrower
(74) *Attorney, Agent, or Firm* — Bejin VanOphem & Bieneman PLC (57) ABSTRACT

A composite formulation consisting of agglomerated industrial/residential sewer sludge and recycled high density polyethylene (HDPE) and/or polypropylene (PP) materials. The recycled plastic materials act as a binder for the pozzolan industrial/residential sewer sludge. The composite formulation can be produced in a batching process wherein the sieved dried sewer sludge and the recycled plastic in appropriate small cut pieces is fed into a large plastic extruder, heated and extruded into specific structures. The formulation can also be compounded using a compression mold wherein sieved dry sewer sludge are added to heated chopped recycled plastics and heat mixed to produce pellets or directed into a compression mold to create a structural member of predetermined shape.

14 Claims, 6 Drawing Sheets

METHOD OF MAKING STRUCTURAL MEMBERS USING WASTE AND RECYCLED PLASTICS

CROSS-REFERENCE TO RELATED APPLICATIONS

None.

FEDERALLY SPONSORED RESEARCH OR DEVELOPMENT

None.

SEQUENCE LISTING

None.

BACKGROUND OF THE INVENTION

1. Field of the Invention

The present invention in general, relates to the utilization of byproducts of incineration, i.e., dry commercial/residential sewer sludge normally disposed of in a landfill is combined with recycled high density polyethylene (HDPE) and/or polypropylene plastics (PP).

More specifically, the present invention relates to a composite formulation useful as raw material in the manufacture of composite end products, such as structural and non-structural building materials, railroad ties, shingles, decking, portable bridges, roadway paving or asphalt repair, as well as bullet proofing articles.

2. Description of the Prior Art

Concerns over dwindling landfill space have been the primary motivation in the implementation of recycling programs throughout the United States the past twenty years. Recycling efforts have been implemented to separate out reusable waste materials from waste materials that cannot be recycled often at fair expense to the municipality implementing the recycling program. The municipality promotes recycling to slow down the cost associated with the escalating of tipping fees at the landfill which have continued to escalate, principally because the volume of unrecyclable materials are continuing to escalate.

Waste not subject to recycling includes automobile tires, styrofoam, ashes, used carpet backing, mineral waste, lumber waste, a variety of cellulose fibers, and plastics. Ash has a very high disposal cost because it is typically generated from incinerators and contains heavy metals. Because of the presence of colored ink, substances such as colored paper, colored fabrics, and synthetic fabrics pose recyclability problems. Many waste forms that are not recyclable are often also not biodegradable ergo the expanding need for land fill space continues to exist in spite of the growing recycling activities throughout the country.

Because of the perceived urgency of this continuing growing problem, a plethora of applications exist in the prior art to convert some of these unrecyclable waste forms into usable products, many of which are intended to be used for building materials. Unfortunately, many of the proposed conversion processes incorporate the use of chemical compounds in processes which have limited long term stability and can be cost prohibitive. For example, some of the current methods propose the use of incorporating organic compounds, such as formaldehyde, in polymeric binders. Organic binders are flammable and give off noxious fumes during settling, and have limited long term stability. Likewise, with the use of ceramic binders, which are considered cost prohibitive because these processes require high weight ratios of ceramic binder to waste form. Also, high concentrations of ceramic binder to waste form reduces flow characteristics of the slurry and leads to undesirable fast curing which is undesirable for applications in making structural components.

Products that contain significant amounts of regenerable and/or recyclable materials are taught in U.S. Pat. No. 4,947,611 to Otsuka. Otsuka discloses a wall panel containing clay in combination with straw, chaff, and palm material. The panel may optionally include hemp. Kakuk, U.S. Pat. No. 5,177,924, discloses a structural building components kit which consists of straw, chaff, and/or rice husks, using mineral additives as well as cement, lime, and/or gypsum.

Cellulose fiber has also been used as a reinforcing ingredient in thermoplastic compositions. U.S. Pat. No. 3,856,724 issued to O'Connor et al. describes a composite based on polypropylene or low density polyethylene (density 0.92) and 5% to 45%, preferably 20%, by weight of alpha-cellulose (100-mesh flock) along with some additives to make reinforced polymer composition. Arons et al., U.S. Pat. No. 3,875,088, discloses a composite material comprising 50% to 75% of a thermoplastic resin binder (ABS or rubber-modified polystyrene) and 20% to 40% of wood flour (40-mesh and 100-mesh), with the ratio of plastic to wood flour being between 1.5 and 3.0 and uses this to make pencils. U.S. Pat. No. 3,878,143 to Baumann et al., discloses a composite material comprising 63% by weight of polyvinyl chloride or polystyrene or ABS, and 30% of wood flour along with some minor additives in order to neutralize acidic gaseous matter emitted from the wood under certain temperature conditions. Hamed, in U.S. Pat. No. 3,943,079, discloses a composite material comprising thermoplastic polyvinyl chloride polymer and cellulose fiber as major components, the cellulose fibers being wood pulp or cotton linters in amounts ranging from 16% to 30% by weight of the total to incorporate discontinuous cellulose fiber into massed polymers. Armenti et al. discloses, in U.S. Pat. No. 4,165,302, filled thermoplastic resin compositions comprising low-density polyethylene, polypropylene, and other resins (in amounts ranging from 50% to 95% by weight), organic fillers (such as wood flour), and inorganic fillers (such as fly ash or calcium carbonate). The '302 patent is concerned principally with increasing the melt flow index of filled thermoplastic resin compositions rather than their mechanical properties.

It was quickly recognized that fillers, particularly cellulose fibers, do not disperse easily throughout the plastic formulations during mixing and molding. Therefore, the finished products typically do not exhibit the desirable physical characteristics ordinarily associated with fiber-reinforced plastic composites. Accordingly, this problem was dealt with in a number of patents. For example, in U.S. Pat. No. 4,250,064 to Chandler describes usage, along with low-density organic fibers (such as polyester fiber or cellulose fibers), of a combination of coarse and fine inorganic filler such as calcium carbonate (20% to 50% by weight), which makes the organic filler more easily and uniformly dispersed in a plastic matrix (preferably chlorinated polyethylene or vinyl chloride/vinyl acetate copolymer), avoiding visible clumps of fiber. Higher heat resistance, flame retardancy, and mechanical strength were features claimed by Nakagima in U.S. Pat. No. 4,339,363. This patent disclosed that compositions of crushed wastepaper (40% to 60% by weight) and polyethylene, polypropylene, or other thermoplastic resin and their combinations, including an organic filler such as calcium carbonate, talc, barium sulfate, or the like (8% to 12%) by weight), provided the higher heat resistance, flame retardancy, and increase mechanical strengths. Further, methods of improving dispersibility of cellulosic fibers in a thermoplastic matrix are described in U.S. Pat. No. 4,414,267 to Coran et al. as well as U.S. Pat. No. 4,559,376 to Kubat et al.

In the cellulosic-plastic composite field, increasing attention is paid to improve the physical properties, such as mechanical strength, stiffness, resistance to thermo deformation, etc. of the composite product. Motegi et al., in U.S. Pat. Nos. 4,687,793 and 4,783,493, describes elimination of moisture from cellulosic fibers (wood flour, rice hulls, wastepaper, pulp, etc.) before blending them with a thermoplastic polymer (polyethylene, polypropylene, ABS, polyvinyl, chloride, etc.) to attain greater physical properties. Also, compatibilizers markedly improve physical properties of the polymeric composite, its weatherability, and overall performance (see U.S. Pat. Nos. 4,376,144; 4,791,020; 4,820,749; and 5,008,310).

U.S. Pat. No. 5,241,795 to Giroux et al. discloses a building block product made from paper sludge, re-pulped wastepaper, or virgin paper pulp. This material is mixed with clay or portland cement, or with animal protein adhesives, or with manufactured resins or polymers.

U.S. Pat. No. 5,482,550 by Strait discloses a structural product of portland cement, recycled and ground expanded cellular polystyrene, ground cellulosic fiber, fly ash, silica fume, bentonite, water, air entrainer, paraffin wax emulsion, and rubber emulsion. This product serves as a roofing material.

Mandish and Maxwell, U.S. Pat. Nos. 5,724,783 and 5,729,936, respectively disclose wall panels made with recycled materials. Mandish's panel includes using fiberglass insulation, recycled polystyrene, rubber tires and old carpets. Maxwell discloses the use of fiber slurry composed of wastepaper, waste cardboard, straw, leaves, and grass clippings. The slurry which may contain waterproofing agents, fire retardants, anti-fungal agents, and insecticides is poured into a press form for compression.

As is clear from the preceding overview of the prior art, the use of recycled thermoplastic plastics in structural products is very limited. Items made of such plastics constitute one of the largest sources of raw material used for recycled matter. A plastic number coding is used to separate categories of recycled plastic according to their chemical composition properties and recyclability. A large number of recycled plastic items (milk and water jugs, detergent bottles, margarine tubs, bags, and yogurt containers) are composed of high and low density polyethylene classified as Codes 4 and 2. Similarly, many items (prescription bottles and plastic lids) consist of polypropylene classified as Code 5.

A need still exists in the prior art for a method to utilize or otherwise dispose of non-recyclable and non-biodegradable, benign waste without generating secondary waste streams. Although the prior art includes various thermoplastic composites based on waste materials, few of these materials are readily available on a wide spread and cost effective basis. Moreover, their proportion in the overall composite mixture tends to be somewhat low, since high proportions of non-plastic components can compromise mechanical properties. As a result, the environmental benefits offered by these compositions are limited. A need still exists for an inexpensive structural product which is partially comprised of benign waste.

Ash landfills are far more dangerous and toxic than raw trash landfills. Incinerator ash is extremely hazardous, containing dioxin and heavy metals such as lead, mercury, and cadmium. Ash landfills or monofils can never become non-toxic because most of the toxic materials in them, the heavy metals, do not bio-degrade. Accordingly, the need for a method to utilize or otherwise dispose of non-biodegradable waste such as incinerator ash without generating a secondary waste stream is paramount.

SUMMARY OF THE INVENTION

The invention is a method of formulating a feed stock made from mixing sewer sludge with recycled plastics. The sewer sludge is a byproduct of municipal incinerator burning both residential and commercial waste products and generating a Type 2 Class B fly ash. This fly ash, in the form of dried sewer sludge, is mixed with recycled plastics to create a feed stock which can be compounded in a continuous batching process such as an extrusion machine and extruded into composite end products such as construction materials, decking materials, railroad ties, etc. Alternatively, the feed stock may be compounded using compression mold techniques into pellets and thereafter the pellets are fed into a mold to shape the final product such as building materials, fencing, roofing tiles, sound barriers, roadbeds, decking materials, acoustic and temperature insulation as well as bullet proof armor plate.

Accordingly, one objective of the method of the invention is a method of making structural members and structures utilizing quantities of recycled plastics as well as large quantities of incinerator fly ash.

Another objective of the invention is a method of manufacturing a variety of structural materials and products that is only based on utilizing recycled materials that would normally be disposed of in a Class I landfill.

A further object of the invention is a method that can be implemented economically with commercially available waste materials and equipment, modified only to the extent necessary to adapt to the requirements of the invention.

One aspect of the invention concerns a method of making a structural member. The method consists of mixing dried sewer sludge with heated recycled plastic resin to obtain a fluidized mixture. If the mixing is performed by an injection molding machine, the fluidized mixture may be delivered into a mold in order to mold the feedstock into a product. If the mixing is performed by a helical screw of an extruding machine, the fluidized mixture is extruded using a continuous batch process into a final product.

By using recycled plastics, it is believed that the plasticizers that are mixed into the virgin plastics, lowers the melting temperatures sufficiently to make the recycled plastic more fluidic at a lower temperature. By using the dry inorganic sludge filler composed of particles that are of different sizes and spherical in shape, it is believed that the increased fluidity of the heated recycled plastic creates more packing density resulting in the plastic creating a very strong bond between it and the inorganic filler thereby imparting strength to the structural member. Further, the sewer sludge carries a positive charge while the heated recycled plastic carries a negative charge. This factor also contributes significantly to the strong bond created between the inorganic filler and the recycled plastic.

The recycled plastic utilized in the preliminary tests conducted to date includes high (code 2) and/or low (code 4) density polyethylene as well as polypropylene (code 5) or a combination thereof. It is believed that other coded recycled plastics such as code 1, PET (polyethylene terephthalate); code 3, PVC (polyvinyl chloride); code 6, PS (polystyrene); and code 7, other (mixed plastics), may be candidates for use in the inventive method.

The best candidates so far for recycled plastic used in the inventive method includes polypropylene and polyethylene while the best candidate for the dry sewer sludge is a Type 2 Class B fly ash obtained from the fluidized bed incinerator facility used by the Detroit Water Treatment Plant and waste facility (DWTP) which processes both residential and commercial waste streams through its fluidized bed incinerators. The dry sewer sludge constitutes approximately 50-80 weight percent of the feed stock while the recycled plastic can constitute up to approximately 20-50 weight percent of the mixture. The dry sewer sludge and recycled plastics can be heated to a temperature between 100° and 230° centigrade (about 250° to 458° F.). The mixture may then be batched into a plastic extruder for a continuous process operation and made into pellets which can be fed into a mold and compounded into a finished part.

Various other advantages and uses for the invention will become clear from its detailed description in the specification that follows as well as from the novel features distinctly claimed in the appended claims. Therefore, in order to attain the objectives set forth hereinabove, this invention consists of features illustrated in the drawings and, the preferred embodiment set forth in the detailed description. However, such drawings and description disclose but one of the various ways in which the invention will be practiced, and are not intended to be limiting.

DETAILED DESCRIPTION OF THE PREFERRED EMBODIMENT

The invention was a discovery resulting from some earlier work performed by the inventors in an effort to combine dry sewer sludge with cement in an attempt to fabricate patio blocks. This project was unsuccessful for the reason that the cement blocks were not curing properly. An extensive effort was made to review patented techniques disclosed in prior art patents to attempt to learn what their teachings provided regarding curing of cement. No clear answer was discovered by this extensive effort and the inventors could not understand how these patent owners could end up with a usable product from the teachings set forth. Therefore, after three months of devotion, the best that was obtained was a cement block which after 28 days of curing could be scraped with your fingernail and would result in flaking off the surface as if scraping a piece of chalk.

In the continued search for a solution to the curing problem of the cement and dried sewer sludge composite, the inventors became involved with processing small broken recycled marble pieces from countertops and noted that the small marble (metamorphosed limestone) pieces were encapsulated by the epoxy cement which led to the idea of encapsulating the dried sewer sludge particles.

The inventors' first attempt to encapsulate the dry sewer sludge particles was to mix the sludge with chopped up small pieces of a plastic milk carton. The plastic was heated to a fluidized state and thereafter mixed with small portions of the dried sewer sludge resulting in small pellets of the composite material which were thereafter placed in an injection machine to mold a series of plaques which were loaded with approximately 50 weight percent of sewer sludge. The test was limited to 50% by weight of the filler because the molding machine owner was fearful of damaging the injection molding machine. Although the plaques were not compounded with sufficient filler to do any strength testing, the plaque samples showed remarkably good dispersal of the recycled plastic in the composition.

From continuing testing techniques the inventors discovered that the method and composition of the invention resulted in making very strong structural members which enables the commercial production of not only structural members but also road beds and road building materials, fences, railroad ties, building products, sound barriers, as well as bullet proof plate. These completed products are made 100% from waste materials and recycled thermoplastics such as polyethylene and polypropylene.

For purposes of the preferred embodiment, the following disclosure is presented in terms of using polypropylene and/or polyethylene, but it is understood that the invention is applicable to other recycled thermoplastics. Further, the disclosure applies to a single type of recycled plastic as well as a mixture of two or more types of recycled plastics. The disclosed temperature ranges were discovered to apply to both polyethylene as well as polypropylene and to mixtures of both.

The composition of the present invention does not require cement, plaster, fibrous materials, any form of cellulosic materials, or wood chips. In contrast, the composition of the invention requires, preferably, a Type 2 Class B fly ash obtained from the fluidized bed incinerator facility used by the Detroit Water Treatment Plant and Waste Facility (DWTP) which processes both residential and commercial waste streams through its fluidized bed incinerators, and a recycled plastic, such as a polyethylene, polypropylene, or a combination thereof.

Figure 1:
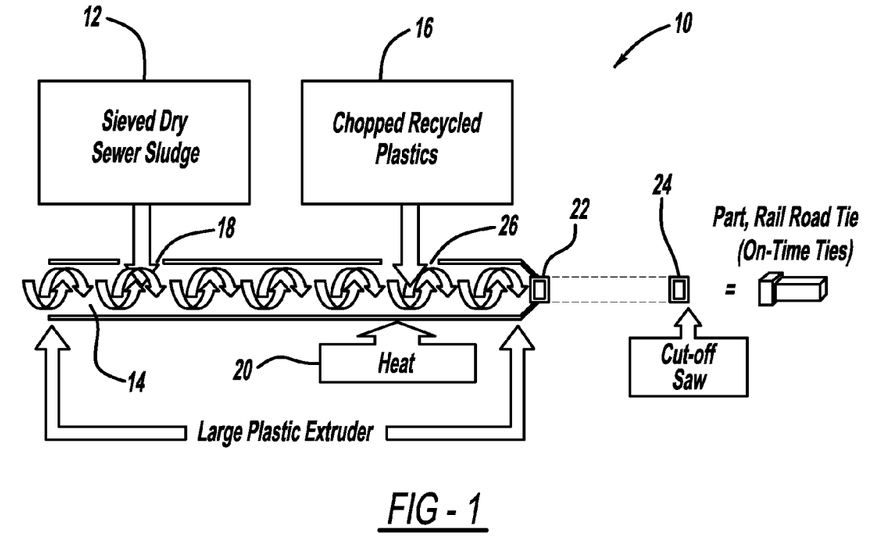
FIG. 1 is a schematic representation of a continuous batching process used to make a composite mixture into a structural member according to the method of the invention.
Figure 2:
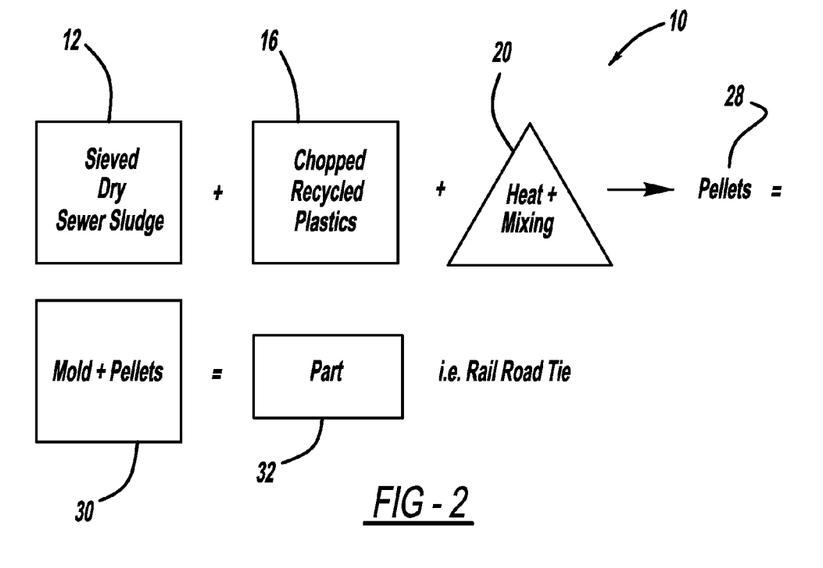
FIG. 2 is a schematic representation of a compression molding technique used to make a composite mixture into a structural member according to the method of the invention.

With reference to FIGS. 1 and 2, the two different processes used to make products for the inventive composition are illustrated. In FIG. 1, there is illustrated a continuous batch 10 method of making the feed stock into a final product. Sieved dry sewer sludge 12 is fed into a tapered screw of an extruder 14 and mixed with chopped recycled plastic 16 which is fed into the same extruder screw downstream of the sewer sludge inlet 18. Heat 20 is applied to melt the plastic into a fluidized state and mix with the sieved dry sewer sludge 12 until a composite mixture is obtained. The amount of heat applied is a function of several factors. In the first place, the amount of heat applied is a function of the type of recycled plastics 16 that is used to mix with the sieved dry sewer sludge 12. As noted earlier, the best candidates at this time are recycled polypropylene, polyethylene, or a combination of these two recycled plastics. Other candidates include recycled polystyrene (PS), recycled polypropylene (PP), recycled polyvinylchloride (PVC), recycled polyethylene terephthalate (PET), and other mixed recycled plastics.

In the best case scenario, the dry sewer sludge 12 constitutes approximately 50-80 weight percent of the feedstock or composition mixture while the recycled plastic 16 can constitute up to approximately 20-50 weight percent of the total composition (using polyethylene, polypropylene, or a combination thereof). In the extrusion process, it is also important to consider the heat generated due to the shear created by the sewer sludge 12 as a result of the mixing screw action of the extrusion process. With this knowledge, dry sieved sewer sludge 12 is delivered to the extruder at an elevated temperature. As the sewer sludge 12 is moved along the tapered screw 14, pieces of recycled plastic 16 are introduced into the flow downstream of the dry sewer sludge inlet 18. The recycled plastic 16 will absorb the heat from the heated sludge or from the heater 20 input temperature of between 100° and 300° centigrade and become fluidic and as a result of the action of the extruder screw 14 begin to mix with the dry sewer sludge 12 to become a composite mixture as it is moved along the extruder screw 14 until it is forced to travel through an extruder die 22 and a final product is created and cutoff by a cutoff saw or die 24. As will become clear to a person skilled in the art, the continuing process must be tweaked so as to avoid wasting energy by adding more heat than what is required on a continuous feed basis. Also, instead of heating sewer sludge 12 before it enters the extruder, the sludge 12 can be entered at room temperature and the added heat 20 at the recycled plastic inlet 26 may be raised to fluidize the recycled plastic as it is fed into the extruder.

As earlier stated, an extrusion die 22 of the parts to be fabricated is mounted at the end of the extruder such that the final product may be extruded from the extruder and cutoff to desired size. Products such as railroad ties, 2×4 or 2×6 building studs, fence pipe, and decking materials are typical of products made in a continuous batch extrusion process as shown in FIG. 1.

FIG. 2 schematically illustrated another production technique for the invention. In the compression mold process, sieved dry sludge 12 is mixed with chopped recycled plastic 16 in a conventional industrial mixer/grinder (not shown) such as those obtainable from Morbark, Diamond Z, Duratech, and Rexworks, etc. While the mixing occurs, heat 20 is added at a temperature of 100° to 230° centigrade to melt the recycled plastic 16 to a fluidized state so as to disperse the recycled plastic 16 into the sieved sewer sludge 12 and to yield a uniformly distributed mixture which may be stored as pellets. The hot mixture or pellets can be processed directly in a conventional compression molding press 30 to produce structural members 32 shaped to desired sizes.

Figure 3:
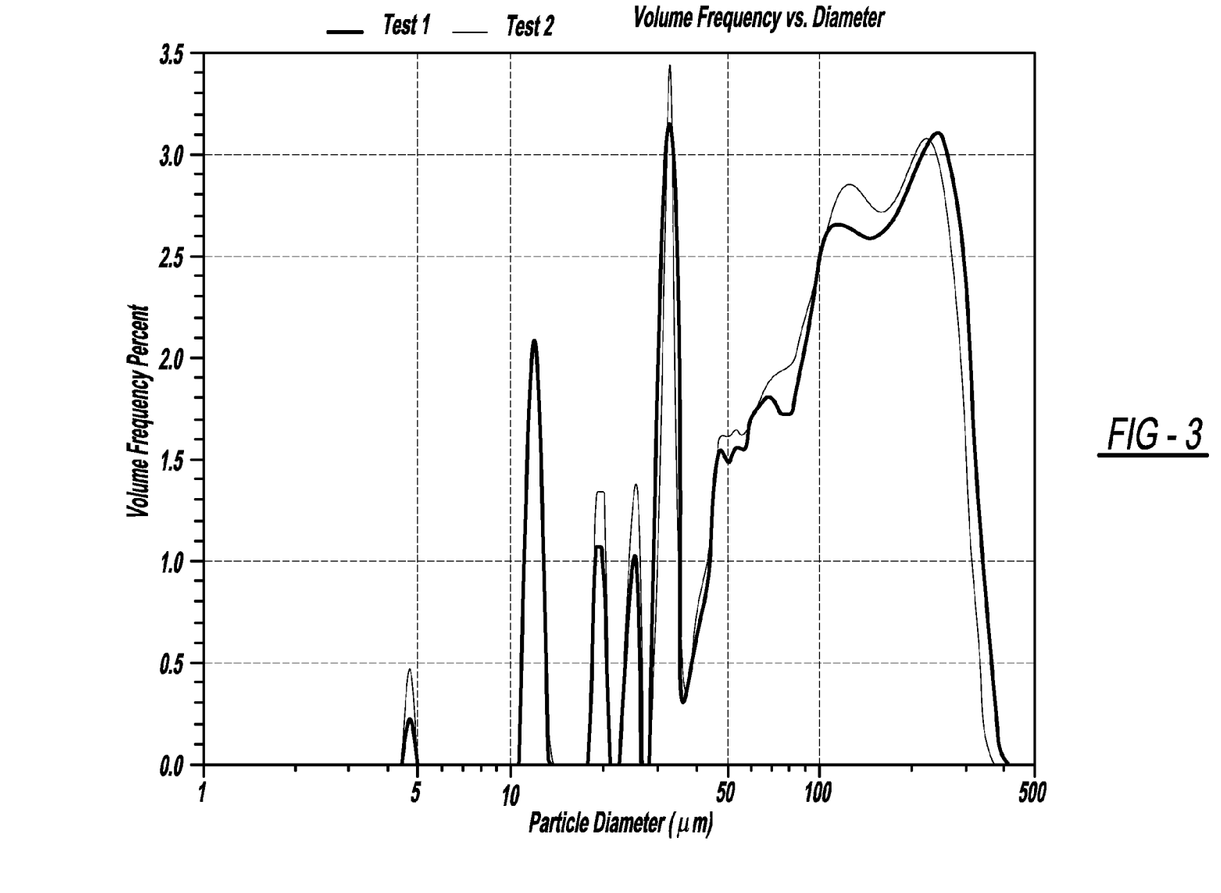
FIG. 3 is a graph illustration of the volume frequency versus diameter and reflects a near perfect Gaussian curve distribution (bell shaped) for the particle sizes of the inorganic filler.

By using recycled plastics, it is believed that the plasticizers that are mixed into the virgin plastic lowers the melting temperatures sufficiently to make the recycled plastic more fluidic at a lower temperature. By using the dry inorganic sludge filler composed of particles that are of different sizes as is clearly illustrated in FIG. 3 which shows that the particle sizes of inorganic filler approximates a perfect filler gaussian curve (bell shaped). Further, because the particles are spherical in shape, it is believed that the increased fluidity of the heated recycled plastic causes a higher packing density when processing the composite mixture resulting in a very strong bond between the recycled plastic and the inorganic filler thereby imparting good strength to the structural member.

Further, the sewer sludge carries a positive charge while the heated recycled plastic carries a negative charge. This factor also contributes significantly to the strong bond created between the inorganic filler and the recycled plastics.

In comparison strength testing conducted by the inventors through an independent test facility, a test sample in the form of a 4.02"×7.97" cylinder of the composite mixture of the invention was tested and compared to a sample in the form of a 4"×8" long concrete cylinder and compression loaded in the test equipment. The failure for the concrete cylinder reflecting a comparison strength of approximately 3,000-4,000 PSI while the test sample of the composition of the invention indicated a compression strength of approximately 3,599 PSI. All of the test samples used in the various tests had filler content of at least 50 weight percent of dry sewer sludge in the composite mixture. An attempt was made to load a 2¼×"× 2.00" puck of the composite mixture of the invention to determine flow and stability of the sample. The results are unknown because the sample strength was greater than the capacity of the test equipment.

Further testing to verify compressive strengths of the inventive composition revealed the following results:

| | | Size | Load | Compression Strength |
|---|---|---|---|---|
| 1) Cube | | 2.1" × 2.2" × 1.92" | 19,850 lbs | 4,296 PSI |
| 2) Cube | before | 2.068" × 2.077" × 2.15" | 24,430 lbs | 5,465 PSI |
| | after | 2.596" × 2.576" × 1.47" | | |
| 3) Cube | before | 2.09" × 2.18" × 2.08" | | |
| | after | 2.20" × 2.28" × 1.88" | 20,130 | 4,414 PSI |

Although samples 2 and 3 significantly condensed during compression testing, both samples returned to its original size upon relieving the compressive load.

Figures 4A, 4B:
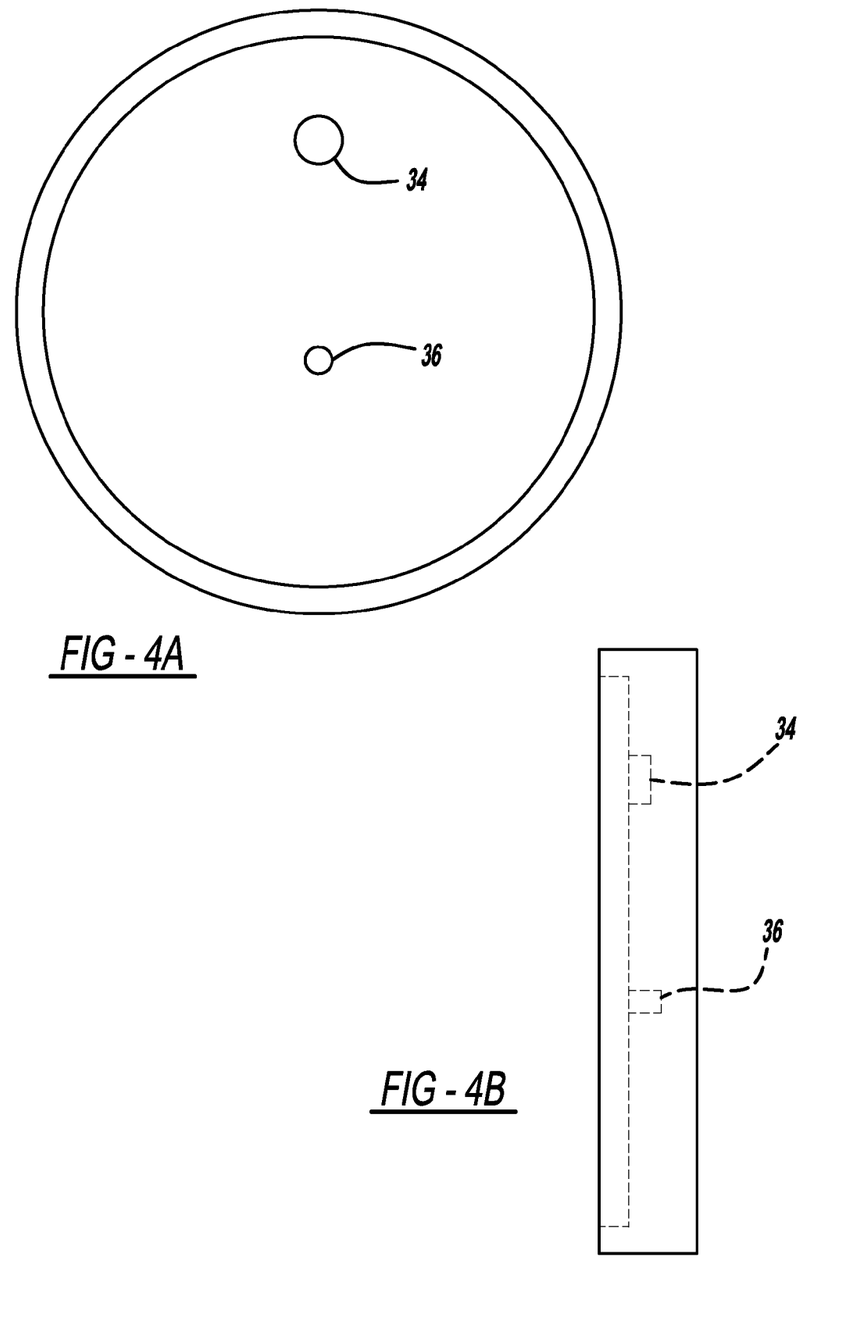
FIG. 4a is a top view of a sample puck 4" diameter by 2" thick which illustrates the penetration of two different size bullets shot at a 15 foot range to reflect the potential of the composite mixture as bullet proof armor plate.
FIG. 4b is a side view of the sample puck shown in FIG. 4a to illustrate penetration of the projectiles.

As testing continues on this inventive composition of recycled plastic with dry sewer sludge, a more recent test reflects that this composition may be a unique material which can be made into bulletproof plate for use on military vehicles and other potential uses. A two and one-half inch diameter puck by two inch thickness as shown in FIG. 4 was tested using a 158 grain size bullet in a 357 magnum revolver 34 shot at a distance of 15 feet penetrated the puck approximately ⅜". A 22 long rifle bullet penetrated the same puck approximately ½" when shot at a 15 ft. range.

Figure 5:
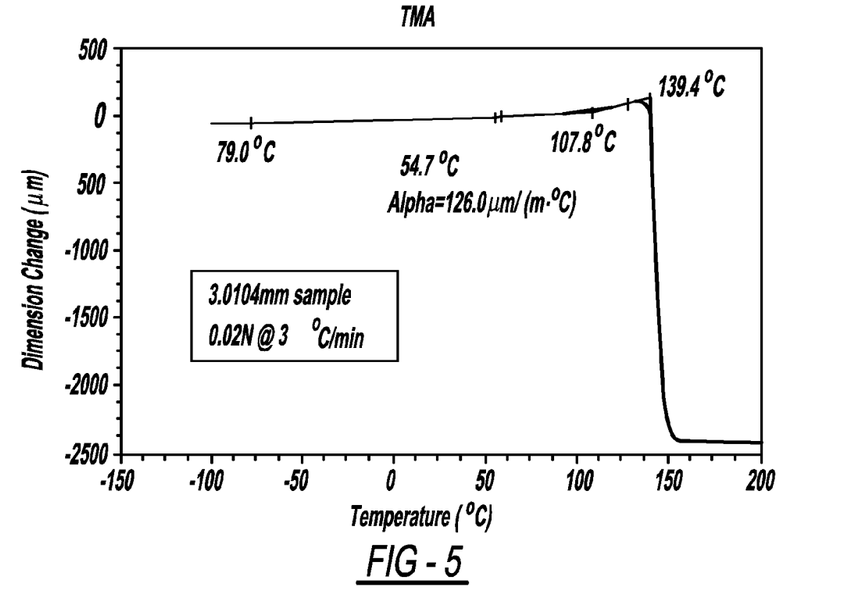
FIG. 5 is a graphical illustration of the expansion and structure change over a temperature range for the composite mixture made according to the method of the invention.
Figure 6:
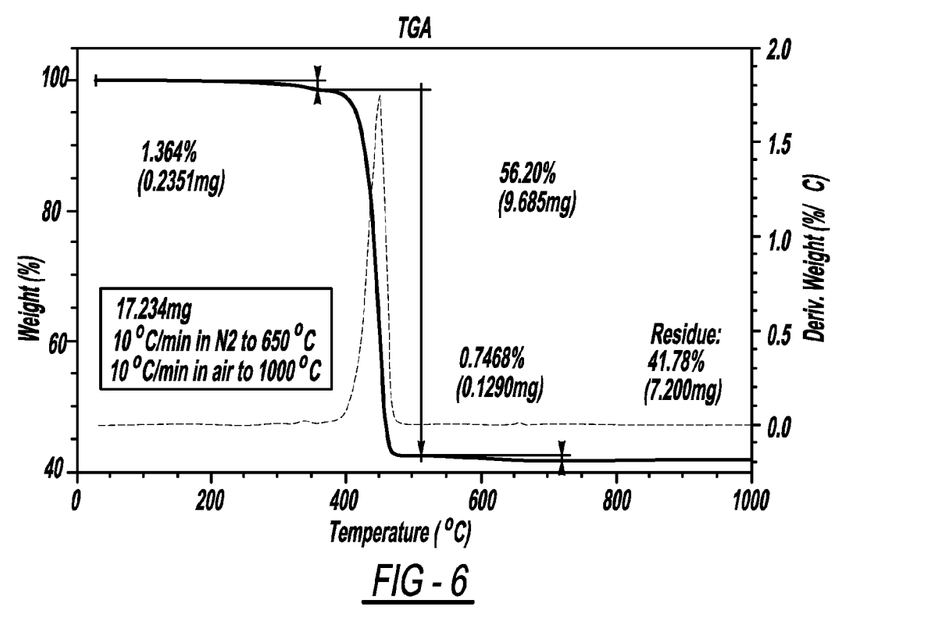
FIG. 6 is a graphical illustration of the weight loss and residue.

FIGS. 5-8 are results of standard testing of composite samples of the invention. FIG. 5 is a thermo-mechanical analysis (TMA) test and is used to determine the deformation of a sample (changes in length or thickness) as a function of temperature. The TMA data in FIG. 5 shows dimension change as the sample expands as it is heated. From this data, the coefficient of thermal expansion (CTE) can be measured. As the sample melts, the probe penetrates into the sample. FIG. 6 illustrates the results of a thermo-gravimetric analysis test (TGA). The TGA test is used to determine the weight loss of a plastic sample when subjected to a rise in temperature under defined atmospheric conditions. The data shows a small weight loss (1.4%) up to ~350° C., with the main decomposition occurring thereafter.

Figure 7:
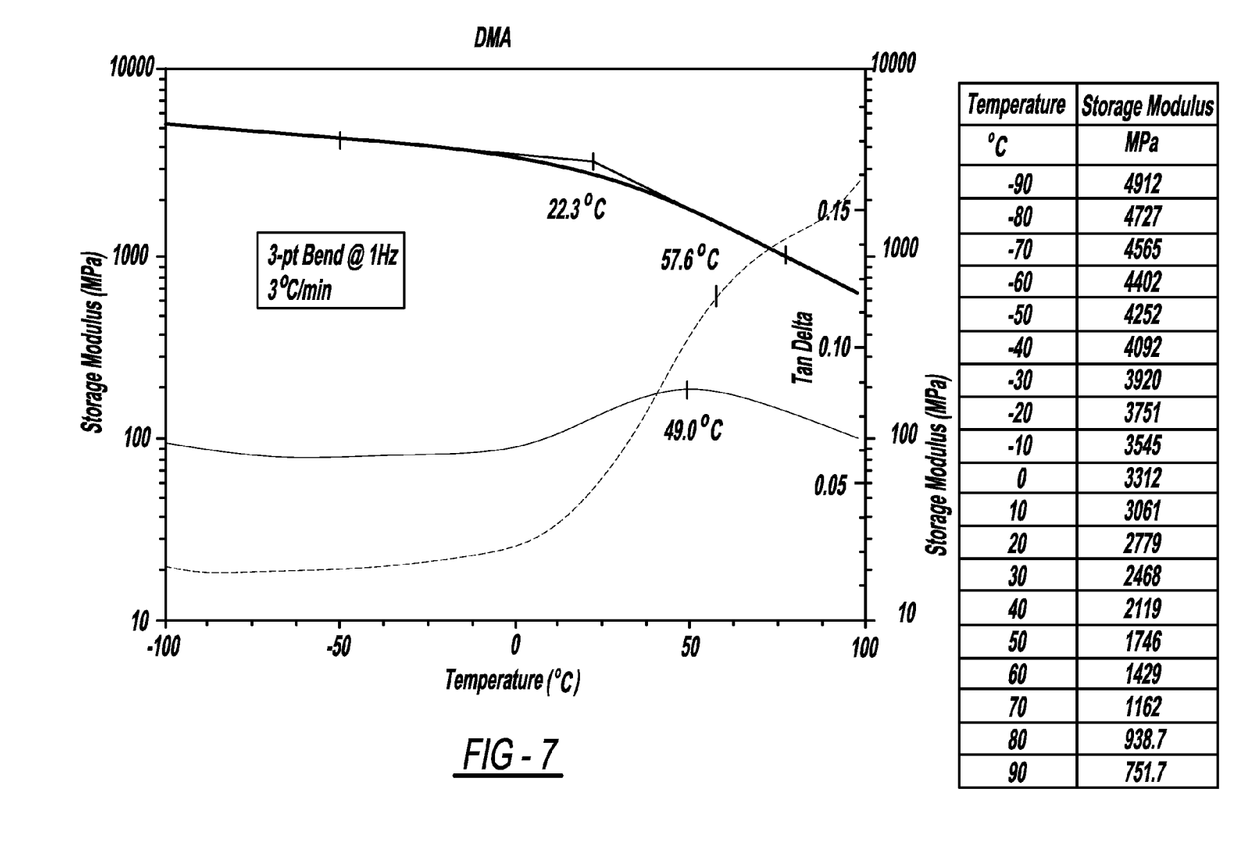
FIG. 7 is a graphical illustration of the modulus and structure change.
Figure 8:
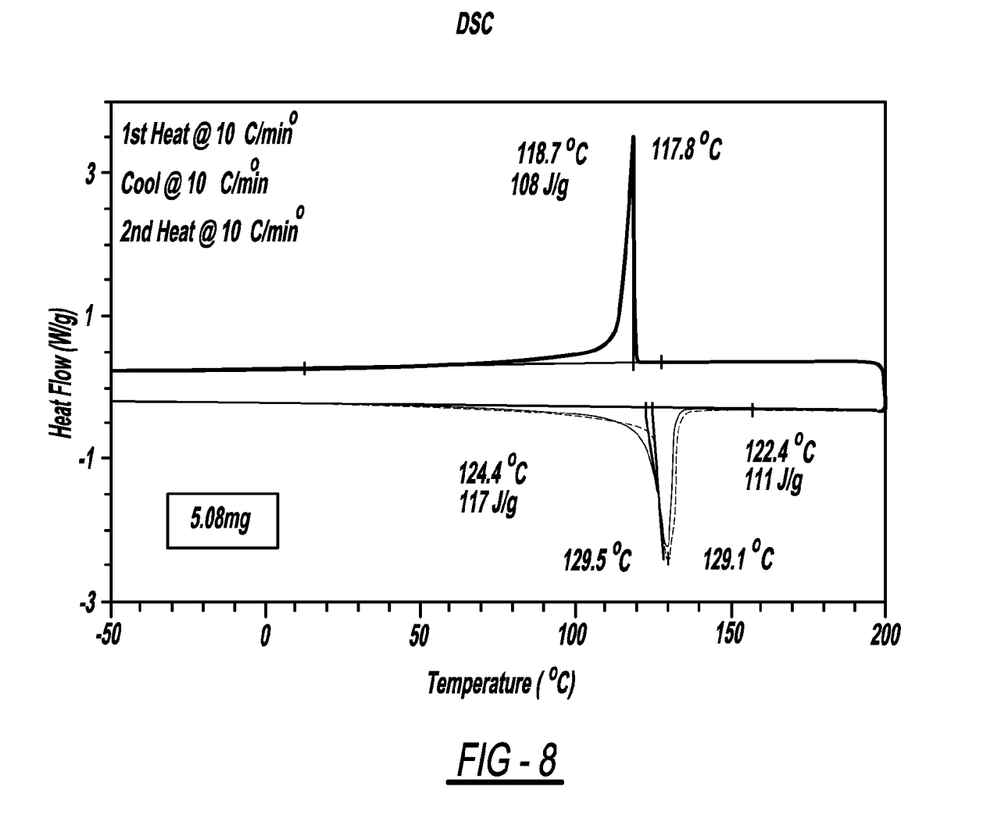
FIG. 8 is a graphical illustration of the melting (temperature and enthalpy), and heat capacity.

FIG. 7 is the dynamic mechanical analysis (DMA) test and is used to study the deformation and flow of materials, whether in liquid, gel, melt, or solid form in terms or their elasticity and viscosity. The data in FIG. 7 shows the storage modulus slowly dropping with temperature as the sample softens. Finally, FIG. 8 is a differential scanning calorimetry (DSC) test and is used to detect the difference in heat flows between a sample and a reference crucible that are simultaneously exposed to the same heating and cooling rates. The DSC data of FIG. 8 shows a single melt at ~129° C.

The advantages of this composite formulation are many fold. Most important is the simplicity of the method by which strong structural articles can be manufactured using large quantities of recycled materials. Further, the method of making the composite formulation has very low energy requirements and can be made with conventional manufacturing equipment in order to manufacture strong structural members. The new inventive composite material contains no petroleum products. Products currently made from petroleum products such as asphalt for roadbeds, shingles, and asphalt repair can be completely eliminated with the use of the inventive composition so that there will be no petroleum products used for these applications. The use of these recyclable products will significantly reduce the need for Class I landfill space. Tipping fees will be eliminated and the dry sewer sludge may result in a revenue stream for municipalities that use incinerators.

While the present invention has been described and disclosed herein in what is believed to be the most practical and preferred embodiment, it is recognized that departures can be made therefrom within the scope of the invention, which should not be considered limited to the details disclosed herein but is to be accorded the full scope of the claims so as to embrace any and all equivalent processes and products.

What is claimed is:

1. A method of making a composite member, said method consisting of the steps of:
   selecting a fly ash sewer sludge material obtained from a fluidized bed incinerator wherein said selected fly ash sewer sludge material is only a non-cellulosic Type 2 Class B fly ash sewer sludge obtained from a fluidized bed incinerator;
   mixing said selected dry non-cellulosic Type 2 Class B fly ash sewer sludge obtained from a fluidized bed incinerator with a recycled plastic to form a uniformly distributed composite mixture;
   heating one of said selected dry non-cellulosic Type 2 Class B fly ash sewer sludge and said recycled plastic during said mixing step to melt said recycled plastic mixture into a fluidized state; and
   forming said uniformly distributed composite mixture into a structural member.

2. The method as claimed in claim 1 wherein said recycled plastic comprises a member of the group consisting of polyethylene and polypropylene.

3. The method as claimed in claim 1 wherein said heating step further comprises heating one of said selected dry non-cellulosic Type 2 Class B fly ash sewer sludge and said recycled plastic to a temperature between approximately 100° and approximately 230° centigrade to fluidize said uniformly distributed composite mixture.

4. The method as claimed in claim 1 wherein said mixing step is adjusted such that particles of said selected dry non-cellulosic Type 2 Class B fly ash sewer sludge constitute approximately 50% to approximately 80% by weight of said uniformly distributed composite mixture and said recycled plastic constitutes approximately 20% to approximately 50% by weight of said uniformly distributed composite mixture.

5. The method as claimed in claim 1 wherein said recycled plastic is selected from the group consisting of recycled polyethylene terephthalate, recycled high and/or low density polyethylene, recycled polyvinyl chloride, recycled polypropylene, recycled polystyrene, and other recycled mixed plastics.

6. The method as claimed in claim 1 wherein said step of mixing comprises the step of extruding said selected dry non-cellulosic Type 2 Class B fly ash sewer sludge obtained from a fluidized bed incinerator with a recycled plastic to form a uniformly distributed composite mixture in an extruder machine.

7. The method as claimed in claim 1 wherein the step of mixing is accomplished in a conventional mixer/grinder and routed to a compression mold machine to mold structural members shaped to desired sizes.

8. The method as claimed in claim 1 wherein said recycled plastic comprises a member of the group consisting of recycled polyethylene terephthalate, recycled high and/or low density polyethylene, recycled polyvinyl chloride, recycled polypropylene, recycled polystyrene, and other recycled mixed plastic, and further consisting of the steps of heating said dry non-cellulosic Type 2 Class B fly ash sewer sludge and recycled plastic mixture to a temperature between approximately 100° and approximately 230° centigrade to fluidize said mixture, and forming said mixture into a composite structural member.

9. A method of construction, said method consisting of the steps of:
   producing a structural member, the producing step including:
   a) mixing particles of only a dry non-cellulosic Type 2 Class B fly ash sewer sludge obtained from a fluidized bed incinerator and particles of a recycled plastic to form a uniformly distributed composite mixture;
   b) heating one of said particles of dry non-cellulosic Type 2 Class B fly ash sewer sludge and said particles of recycled plastic during said mixing step to melt said recycled plastic mixture into a fluidized state so as to obtain a good dispersal of said recycled plastic in said uniformly distributed composite mixture; c) forming said uniform distributed composite mixture into a structural member; and
   erecting a structure using said structural member.

10. The method as claimed in claim 9 wherein said recycled plastic comprises a member of the group consisting of recycled polyethylene terephthalate, recycled high and/or low density polyethylene, recycled polyvinyl chloride, recycled polypropylene, recycled polystyrene, and other recycled mixed plastics.

11. The method as claimed in claim 9 wherein said particles of dry non-cellulosic Type 2 Class B fly ash sewer sludge constitutes approximately 50% to approximately 80% by weight of said uniformly distributed composite mixture and said recycled plastic constitutes approximately 20% to approximately 50% by weight of said uniformly distributed composite mixture.

12. The method as claimed in claim 9 wherein said heating step further consists heating one of said dry non-cellulosic Type 2 Class B fly ash sewer sludge and said recycled plastic to a temperature between approximately 100° and approximately 230° centigrade to fluidize said uniformly distributed composite mixture.

13. The method as claimed in claim 1 wherein said mixing of said dry non-cellulosic Type 2 Class B fly ash sewer sludge within said recycled plastics is accomplished using an extruder screw of an extrusion machine.

14. The method as claimed in claim 1 wherein said mixing of said dry non-cellulosic Type 2 Class B fly ash sewer sludge with said recycled plastics is accomplished using a commercial mixer.

* * * * *